United States Patent
Kim et al.

(10) Patent No.: US 7,558,345 B2
(45) Date of Patent: Jul. 7, 2009

(54) APPARATUS AND METHOD FOR SYNCHRONIZING SYMBOL TIMING SYNCHRONIZATION APPLICABLE TO ORTHOGONAL FREQUENCY DIVISION MULTIPLEXING (OFDM) RECEIVER

(75) Inventors: Yun-young Kim, Suwon-si (KR); Jae-ho Roh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 11/341,585

(22) Filed: Jan. 30, 2006

(65) Prior Publication Data

US 2006/0171493 A1 Aug. 3, 2006

(30) Foreign Application Priority Data

Jan. 28, 2005 (KR) .................... 10-2005-0007859

(51) Int. Cl.
*H03D 1/00* (2006.01)
(52) U.S. Cl. .................. 375/343; 375/354; 375/355
(58) Field of Classification Search ............. 375/343, 375/354, 355
See application file for complete search history.

(56) References Cited

U.S. PATENT DOCUMENTS

| | | | | |
|---|---|---|---|---|
| 6,661,857 | B1 * | 12/2003 | Webster et al. | 375/350 |
| 7,012,881 | B2 * | 3/2006 | Kim | 370/208 |
| 7,058,151 | B1 * | 6/2006 | Kim | 375/355 |
| 7,139,320 | B1 * | 11/2006 | Singh et al. | 375/260 |
| 7,139,338 | B2 * | 11/2006 | Wilson et al. | 375/343 |
| 7,161,996 | B1 * | 1/2007 | Steele et al. | 375/347 |
| 7,415,080 | B2 * | 8/2008 | Echavarri et al. | 375/343 |
| 7,424,067 | B2 * | 9/2008 | Vanderperren et al. | 375/326 |
| 2005/0084046 | A1 * | 4/2005 | Seo | 375/350 |
| 2006/0146962 | A1 * | 7/2006 | Troya et al. | 375/340 |

OTHER PUBLICATIONS

Zheng, "A new synchronization algorithm for UWB impulse radio communication systems", this paper appears in The Ninth International Conference on Communications Systems, 2004, ICCS 2004. Publication Date: 7-7 Sept. 2004, On pp. 25-29.*
Park, "A blind OFDM synchronization algorithm based on cyclic correlation", IEEE Signal Processing Letters, vol. 11, issue 2, Part 1, Feb. 2004 pp. 83-85.*
Muller-Weinfurtner, "Frequency-domain frame synchronization for optimum frequency-differential demodulation of ODFM" Global Telecommunications Conference, 1999. GLOBECOM '99, vol. 1B, 1999 pp. 857-862 vol. 1b.*

* cited by examiner

*Primary Examiner*—Juan A Torres
(74) *Attorney, Agent, or Firm*—Sughrue Mion, PLLC

(57) ABSTRACT

An apparatus and method applied to an orthogonal frequency division multiplexing (OFDM) receiver performs symbol timing synchronization by correlation between channel impulse responses. The apparatus applicable to the OFDM receiver, includes a channel impulse response (CIR) estimator for estimating a CIR of a present symbol from which a symbol timing is to be detected, using a previous symbol received prior to the present symbol; a matched filter for computing the CIR using the present symbol; a correlation calculator for calculating correlation between the estimated CIR and the CIR computed at the matched filter; and a peak detector for detecting the symbol timing by obtaining a timing offset between the estimated CIR and the computed CIR based on a maximum value of the calculated correlation.

8 Claims, 8 Drawing Sheets

| Timing Offset | | -5dB | -3dB | SNR -1dB | 1dB | 3dB | 5dB |
|---|---|---|---|---|---|---|---|
| MF | Mean | -1.3096 | -0.8931 | -0.6025 | -0.3063 | -0.3069 | -0.2999 |
| | Standard Deviation | 6.0976 | 4.8158 | 4.1135 | 3.4423 | 3.1436 | 2.8981 |
| CIR | Mean | -2.9724 | -0.6226 | -0.1765 | 0.0013 | 0.1055 | 0.0955 |
| | Standard Deviation | 13.5682 | 5.6833 | 3.6483 | 2.9272 | 2.5175 | 2.1694 |
| Proposed Perfect CIR | Mean | 0.0070 | 0.0000 | 0.0000 | 0.0000 | 0.0000 | 0.0000 |
| | Standard Deviation | 0.0834 | 0.0000 | 0.0100 | 0.0000 | 0.0000 | 0.0000 |
| Proposed Estimated CIR | Mean | 0.3730 | 0.0640 | 0.1411 | 0.0000 | 0.0000 | 0.0000 |
| | Standard Deviation | 1.3007 | 0.3999 | | | | |

APPARATUS AND METHOD FOR SYNCHRONIZING SYMBOL TIMING SYNCHRONIZATION APPLICABLE TO ORTHOGONAL FREQUENCY DIVISION MULTIPLEXING (OFDM) RECEIVER

CROSS-REFERENCE TO RELATED APPLICATIONS

This application claims the benefit under 35 U.S.C. § 119 (a) from Korean Patent Application No. 10-2005-0007859 filed on Jan. 28, 2005 in the Korean Intellectual Property Office, the entire disclosure of which is incorporated herein by reference.

BACKGROUND OF THE INVENTION

1. Field of the Invention

Apparatuses and methods consistent with the present invention relate to synchronizing symbol timing synchronization applicable to an orthogonal frequency division multiplexing (OFDM) receiver, and more particularly, to synchronizing symbol timing synchronization applicable to an OFDM receiver that performs the symbol timing synchronization by cross-correlation between channel impulse responses.

2. Description of the Related Art

The orthogonal frequency division multiplexing (OFDM) modulation converts incoming serial data to parallel data in unit of a block, multiplexes the parallel symbols to orthogonal carrier frequencies, and thus transforms the broadband transmission to the narrowband transmission. The OFDM, one of multi-carrier modulation algorithms, shows high performance in multipath and mobile telecommunication networks, and enhances frequency utilization by use of a plurality of carriers.

A frame structure of an OFDM signal transmitted by a general OFDM system, includes an effective symbol duration and a guard interval (GI). The effective symbol duration carries data to be transmitted. The GI is used to reduce inter-symbol interference that is caused when a delayed symbol overlaps with a successive incoming symbol through the signal transmitting of the radio channel in the multipath channel environment. Additionally, the GI is used at an OFDM receiver to recover the symbol timing to prevent timing drift because of a symbol clock difference between the transmission and the reception.

Figure 1A:
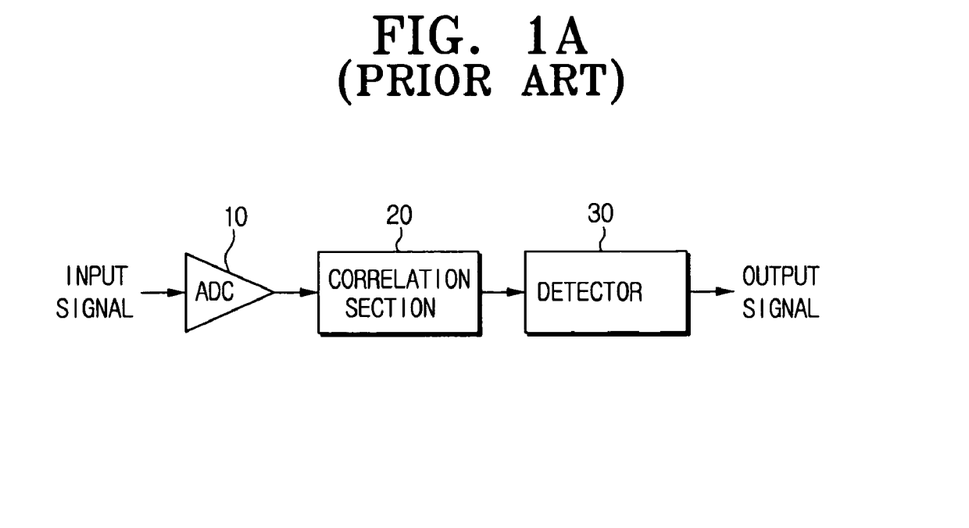
FIGS. 1A and 1B illustrate a conventional symbol timing synchronization apparatus applied to an OFDM receiver using a matched filter.
Figure 1B:
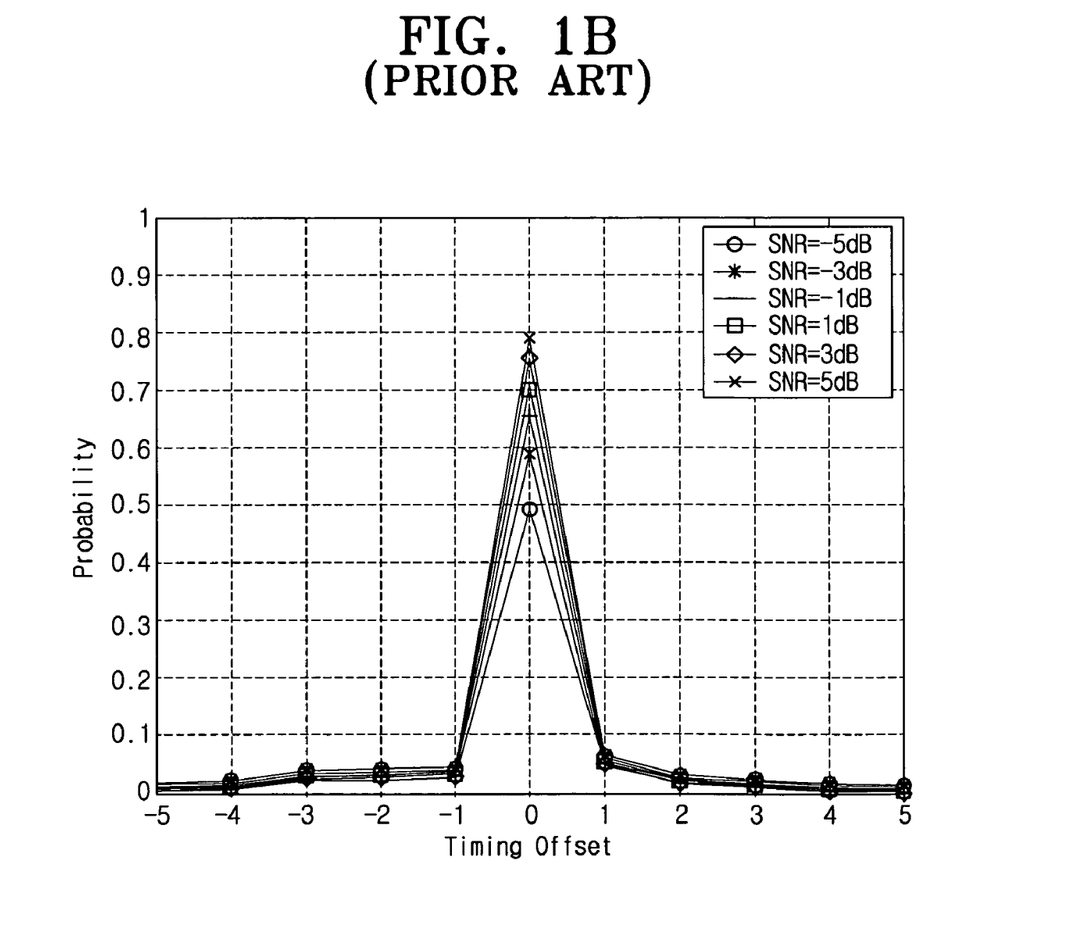

FIG. 1A and FIG. 1B illustrate a conventional symbol timing synchronization apparatus applied to an OFDM receiver by use of a matched-filter. In particular, FIG. 1A is a block diagram of the conventional symbol timing synchronization apparatus applied to the OFDM receiver, and FIG. 1B is a graph showing a timing offset detected by the symbol timing synchronization apparatus of FIG. 1A.

Referring to FIG. 1A, the conventional symbol timing synchronization apparatus applied to the OFDM receiver includes an analog-to-digital converter (ADC) 10, a correlation section 20, and a detector 30.

The ADC 10 converts an incoming OFDM signal to a digital signal by performing sampling, quantization, and coding operations.

The correlation section 20 computes a correlation value between a received signal and a reference signal by multiplying and adding the received digital signal and the reference signal. The reference signal is known in advance in the OFDM transmission and reception. In practice, a complex conjugate of the reference signal is multiplied to the received signal. The correlation section 20 can be implemented by a matched-filter, a correlator, and the like.

The detector 30 detects a timing offset using the computed value of the correlation section 20. To obtain the symbol timing offset, the detector 20 detects a maximum value from multiplication values of the computed values at the correlation section 20, which are fed in sequence. Alternatively, the detector 30 can obtain the symbol timing offset by detecting a maximum value from multiplication values of the incoming signal and the delayed signal.

In FIG. 1B, the timing offset detected by the symbol timing synchronization apparatus using the matched-filter, has a large variance and low accuracy with respect to the detected timing offset. At a signal-to-noise ratio (SNR) ranging from −5 dB to 5 dB, as shown in FIG. 1B, probability of the detected timing offset lies approximately between 50% and 80%. Hence, the detected timing offset is inapplicable with respect to the low SNR. In addition, from the −5 sample to +5 sample based on a location of the effective data of the symbols, it is hard to accurately detect the timing offset in view of its probability.

Figure 2A:
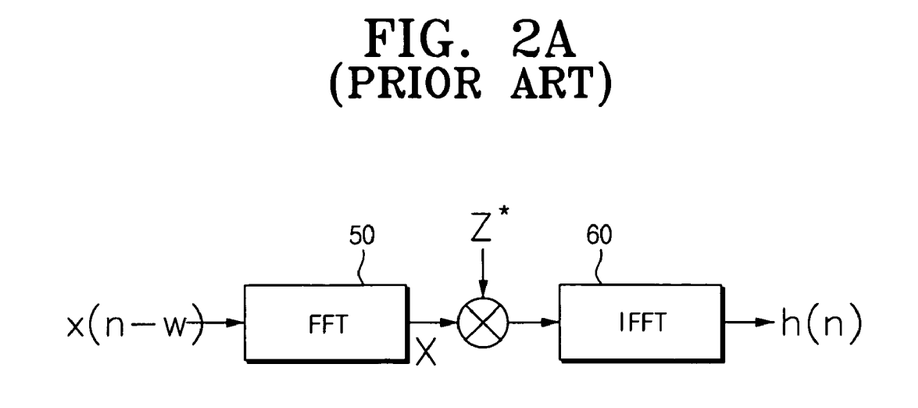
FIGS. 2A and 2B illustrate another conventional symbol timing synchronization apparatus applied to the OFDM receiver using a channel impulse response.
Figure 2B:
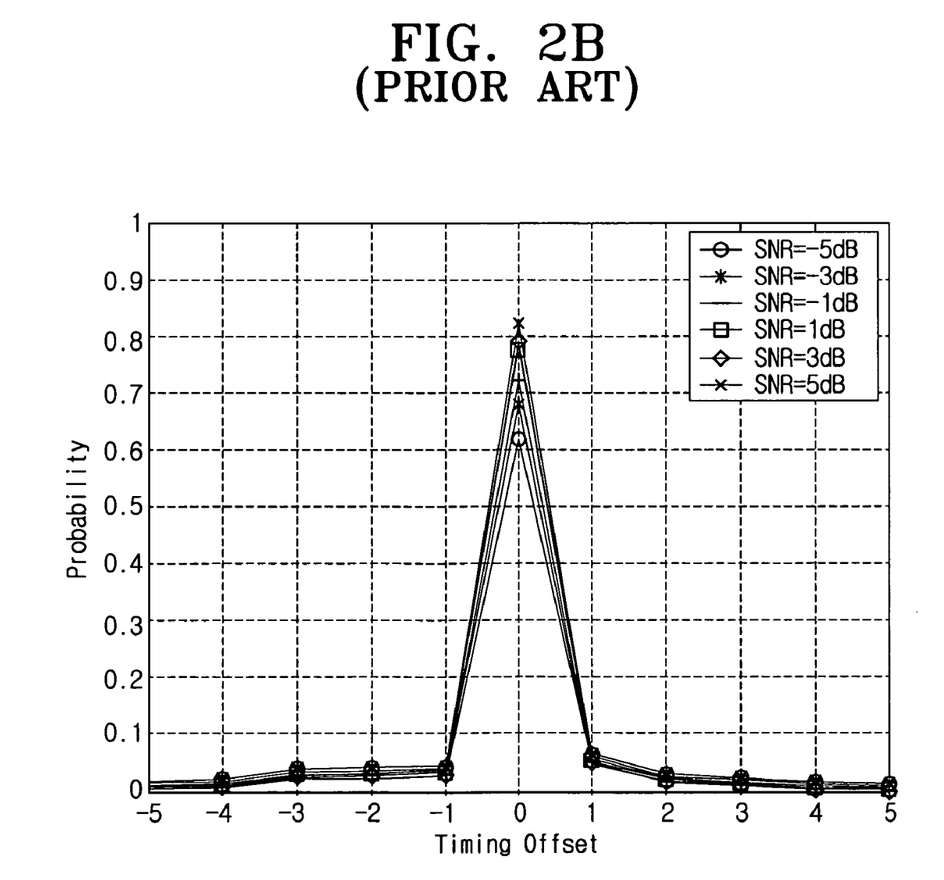

FIGS. 2A and 2B illustrate a conventional symbol timing synchronization apparatus applied to the OFDM receiver using a channel impulse response. In particular, FIG. 2A is a diagram of the conventional symbol timing synchronization using the channel impulse response, and FIG. 2B is a graph showing a timing offset detected by the symbol timing synchronization apparatus of FIG. 2A.

In FIG. 2A, the symbol timing synchronization apparatus detects the timing offset by use of correlation between a time domain and a frequency domain. Here, x(n−w) is a signal delayed by the time w, X is a received signal in the frequency domain, Z is a reference signal known in advance to the frequency domain, and h(n) is the channel impulse response.

In the conventional symbol timing synchronization apparatus, a fast Fourier transformer (FFT) 50 converts an OFDM signal received in the time domain to a signal of the frequency domain. A multiplier multiplies the converted signal by a complex conjugate of the reference signal.

An inverse fast Fourier transformer (IFFT) 60 converts the multiplication value of the received signal and the reference signal in the frequency domain, to a signal of the time domain. As a result, when the received signal matches the reference signal, the output value from the IFFT 60 becomes the channel impulse response.

The output value from the IFFT 60 can be given from Equation 1 as follows.

$$h(n) = IFFT X_k Z_k^* = 1/n \sum_{k=0}^{N-1} X_k Z_k^* * e^{j2\pi kn/N} = \quad \text{[Equation 1]}$$

$$1/N \sum_{k=0}^{N-1} Z_k e^{j2\pi kw/N} Z_k^* * e^{j2\pi kn/N} = \delta(n-w)$$

In Equation 1, h(n) is the channel impulse response, X is the received signal in the frequency domain, Z* is the complex conjugate of the reference signal previously known in the frequency domain, and N is the length of the received signal. It can be seen from Equation 1 that the output value of the IFFT 60 is the delta function that outputs a signal when n=w. As such, the symbol timing w can be detected by the computation of the channel impulse response at the IFFT 60.

Referring to FIG. 2B, similar to the symbol timing synchronization apparatus using the matched filter, the symbol timing synchronization apparatus using the channel impulse response computed at the IFFT has also the large variance and the low accuracy with respect to the detected timing offset. As shown, the probability of the timing offset, which is detected at the SNR ranging from −5 dB to 5 dB, lies approximately between 60% and 80% and is less sensitive to the SNR in comparison with the probability using the matched filter. However, from the −5 sample to +5 sample based on a location of the effective data of the symbols, it is difficult to accurately detect the timing offset in view of its probability.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a symbol timing synchronization apparatus and method applied to an orthogonal frequency division multiplexing (OFDM) receiver that can accurately detect a timing offset by use of correlation between a channel impulse response estimated using a previous symbol and a channel impulse response using a present symbol.

According to an aspect of the present invention, there is provided a symbol timing synchronization apparatus applicable to an OFDM receiver, including a channel impulse response (CIR) estimator for estimating a CIR of a present symbol from which a symbol timing is to be detected, using a previous symbol received prior to the present symbol; a matched filter for computing the CIR using the present symbol; a correlation calculator for calculating correlation between the estimated CIR and the CIR computed at the matched filter; and a peak detector for detecting the symbol timing by obtaining a timing offset between the estimated CIR and the computed CIR based on a maximum value of the calculated correlation.

The CIR estimator may be one of a matched filter and a cross-correlator.

The correlation calculator may calculate the correlation between the estimated CIR and the computed CIR from the following equation:

$$y(n) = \sum_{l=0}^{L-1} x(l+n-n_0)\hat{h}(l) = \\ \sum_{l=0}^{L-1} h(l+n-n_0)\hat{h}(l) + \sum_{l=0}^{L-1}\sum_{m=0}^{N-1} w(l+n-n_0 m)c*(m)\hat{h}(l)$$

where y(n) is the calculated correlation, $\hat{h}(l)$ is the estimated CIR, $x(l+n-n_0)$ is the computed CIR at the matched filter 200, $h(l+n-n_0)$ is the CIR of the present symbol, $w(l+n-n_0+m)$ is a white Gaussian noise, l is a path number, c(m) is a reference signal known to the OFDM receiver, and $n_0$ is the timing offset between the previous symbol and the present symbol.

The peak detector may detect a time having a maximum value of the calculation values of the correlation calculator, as the symbol timing of the present symbol.

According to another aspect of the present invention, there is provided a symbol timing synchronization method applicable to an OFDM receiver, including estimating a CIR of a present symbol from which a symbol timing is to be detected, using a previous symbol received prior to the present symbol; computing the CIR using the present symbol; calculating correlation between the estimated CIR and the CIR computed using the present symbol; and detecting the symbol timing by obtaining a timing offset between the estimated CIR and the computed CIR based on a maximum value of the calculated correlation.

The estimated CIR may be obtained by one of a matched filter and a cross-correlator.

The correlation between the estimated CIR and the computed CIR may be calculated from the following equation:

$$y(n) = \sum_{l=0}^{L-1} x(l+n-n_0)\hat{h}(l) = \\ \sum_{l=0}^{L-1} h(l+n-n_0)\hat{h}(l) + \sum_{l=0}^{L-1}\sum_{m=0}^{N-1} w(l+n-n_0 m)c*(m)\hat{h}(l)$$

where y(n) is the calculated correlation, $\hat{h}(l)$ is the estimated CIR, $x(l+n-n_0)$ is the computed CIR at the matched filter 200, $h(l+n-n_0)$ is the CIR of the present symbol, $w(l+n-n_0+m)$ is a white Gaussian noise, l is a path number, c(m) is a reference signal known to the OFDM receiver, and $n_0$ is the timing offset between the previous symbol and the present symbol.

The detecting of the symbol timing may detect time having the maximum value of the calculated correlation, as the symbol timing of the present symbol.

BRIEF DESCRIPTION OF THE DRAWINGS

The above and/or other aspects of the invention will become apparent and more readily appreciated from the following description of exemplary embodiments, taken in conjunction with the accompanying drawing figures of which.

DETAILED DESCRIPTION OF THE EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention.

Also, well-known functions or constructions are not described in detail since they would obscure the invention in unnecessary detail.

Figure 3:
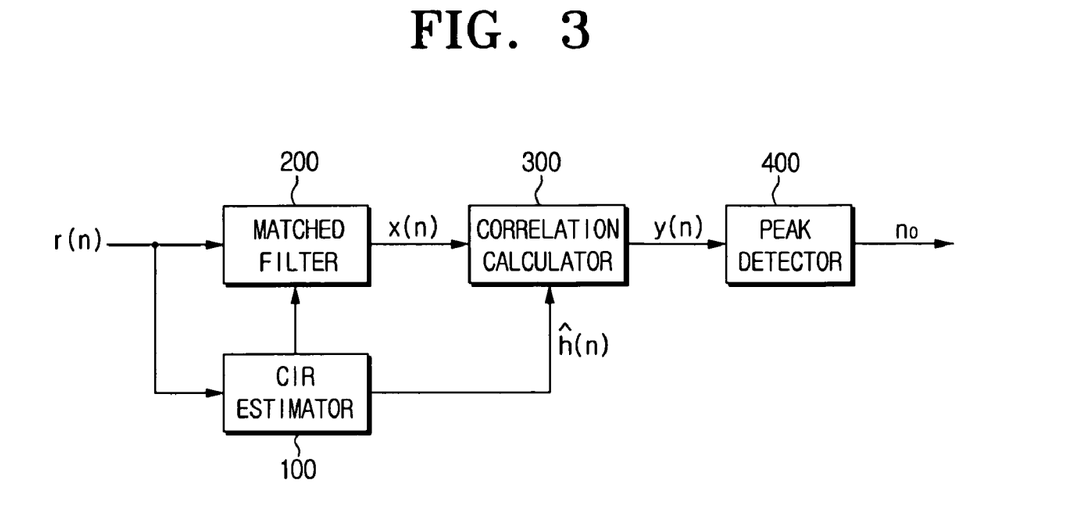
FIG. 3 is a block diagram of a symbol timing synchronization apparatus applied to an OFDM receiver according to an exemplary embodiment of the present invention.

FIG. 3 is a block diagram of a symbol timing synchronization apparatus applied to an OFDM receiver according to an exemplary embodiment of the present invention;

Referring to FIG. 3, the symbol timing synchronization apparatus includes a CIR estimator 100, a matched filter 200, a correlation calculator 300, and a peak detector 400.

The CIR estimator 100 estimates a CIR of a present symbol from which a symbol timing is to be detected using a previous symbol received prior to the present symbol. The CIR of the present symbol can be estimated by computing a correlation value between a signal of the OFDM symbols received prior to the present symbol from which the timing offset is to be detected, and a reference signal known in advance to both OFDM transmitter and receiver. The CIR estimator 100 may be implemented with a matched filter and a cross-correlator.

The matched filter 200 computes a correlation value between the present symbol and the reference signal. At this time, the correlation value is acquired by multiplying a complex conjugate of the reference signal by the received signal and adding up the multiplication values.

The correlation calculator 300 calculates correlation between the CIR estimated using the previous symbol at the CIR estimator 100 and the CIR computed using the present symbol at the matched filter 200. That is, the estimated CIR and the computed CIR go through the convolution.

The peak detector 400 detects a maximum value of output values of the correlation calculator 300. The detected maximum value corresponds to a timing offset between the previous symbol timing and the present symbol timing.

Figure 4:
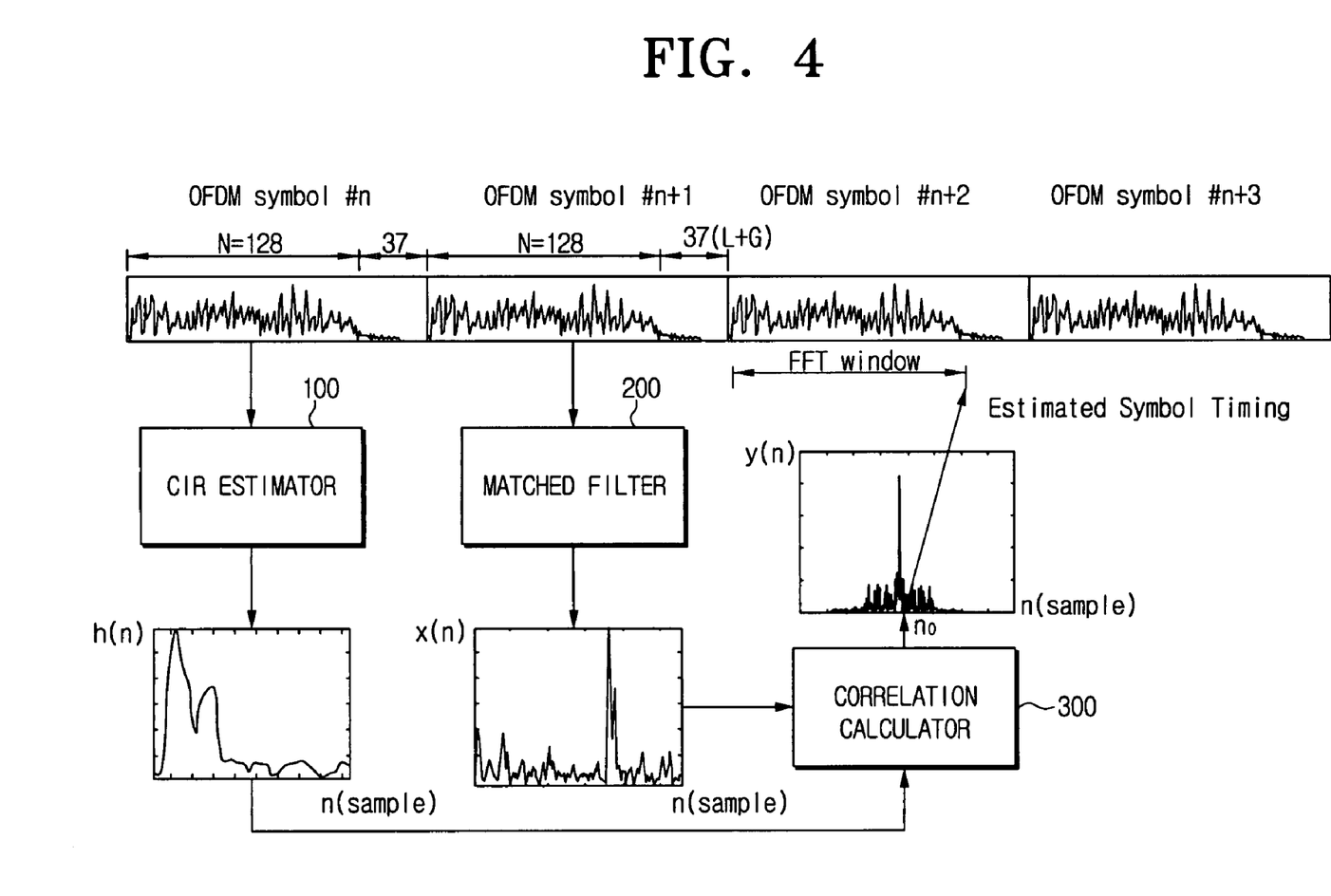
FIG. 4 illustrates operations of the CIR estimator, the matched filter, and the correlation calculator of FIG. 3.

FIG. 4 illustrates operations at the CIR estimator 100, the matched filter 200, and the correlation calculator 300 of FIG. 3. In FIG. 4, N=128 represents a length of an effective symbol duration in one symbol, and a sum of a length (32) of a zero-prefix, indicated as L, and a length (5) of a guard interval, indicated as G is 37.

Referring to FIG. 4, the CIR estimator 100 sets the CIR acquired using a received OFDM symbol #n to the estimated CIR. The CIR estimator 100 estimates the CIR by computing the correlation between the received signal and the reference signal. The received signal can be given by Equation 2 as follows.

$$r(n) = \sum_{k=0}^{N_P-1} h(k)c(n-k) + w(n), 0 \leq n \leq N+L+G-1 \quad \text{[Equation 2]}$$

In Equation 2, $r(n)$ is the received signal, $c(n)$ is the reference signal with the length N, and $h(n)$ is the CIR with the length $n_P$. $w(n)$ is a white Gaussian noise, L is the length of the zero-prefix, and G is the length of the guard interval.

The matched filter 200 computes a CIR of a following OFDM symbol #n+1 of the symbol that is used to estimate the CIR at the CIR estimator 100, by operating the received signal and the reference signal already known. The correlation value outgoing from the matched filter 200 can be obtained from Equation 3 as follows.

$$x(n) = \sum_{m=0}^{N-1} r(n+m)c*(m) = h(n) + \sum_{m=0}^{N-1} w(n+m)c*(m) \quad \text{[Equation 3]}$$

In Equation 3, $x(n)$ is the CIR of the symbol for the detection of the timing offset, $r(n+m)$ is the received signal, $c(m)$ is the reference signal, $w(n+m)$ is the white Gaussian noise. Equation 3 is expressed by substituting the received signal by $r(n+m)$ in Equation 2. Hence, the correlation value, computed at the matched filter 200, between the received signal and the reference signal can be expressed by the summation of the multiplication values of the white Gaussian noise and the complex conjugate of the reference signal, and the summation of the CIR of the OFDM symbol #n+1.

The correlation calculator 300 calculates the correlation by use of the CIR of the previous symbol, which is estimated at the CIR estimator 100, and the CIR of the symbol for the detection of the timing offset, which is computed at the matched filter 200. The correlation between the estimated CIR of the previous symbol and the result value of the matched filter 200 can be calculated based on Equation 4 as follows.

$$y(n) = \sum_{l=0}^{L-1} x(l+n-n_0)\hat{h}(l) = \quad \text{[Equation 4]}$$

$$\sum_{l=0}^{L-1} h(l+n-n_0)\hat{h}(l) + \sum_{l=0}^{L-1}\sum_{m=0}^{N-1} w(l+n-n_0 m)c*(m)\hat{h}(l)$$

In Equation 4, $y(n)$ is the correlation between the estimated CIR of the previous symbol and the computed CIR of the symbol for the detection of the timing offset, $x(l+n-n_0)$ is the result value output from the matched filter 200 based on Equation 3, $\hat{h}(l)$ is the CIR of the previous symbol, which is estimated at the CIR estimator 100, $n_0$ is the timing offset between the previous symbol and the symbol that is used to compute the CIR at the matched filter 200, and l is the path number.

In Equation 4, it can be seen that the correlation, acquired at the correlation calculator 300, between the estimated CIR of the previous symbol and the output value of the matched filter 200 is maximal when $n=n_0$.

Figure 5:
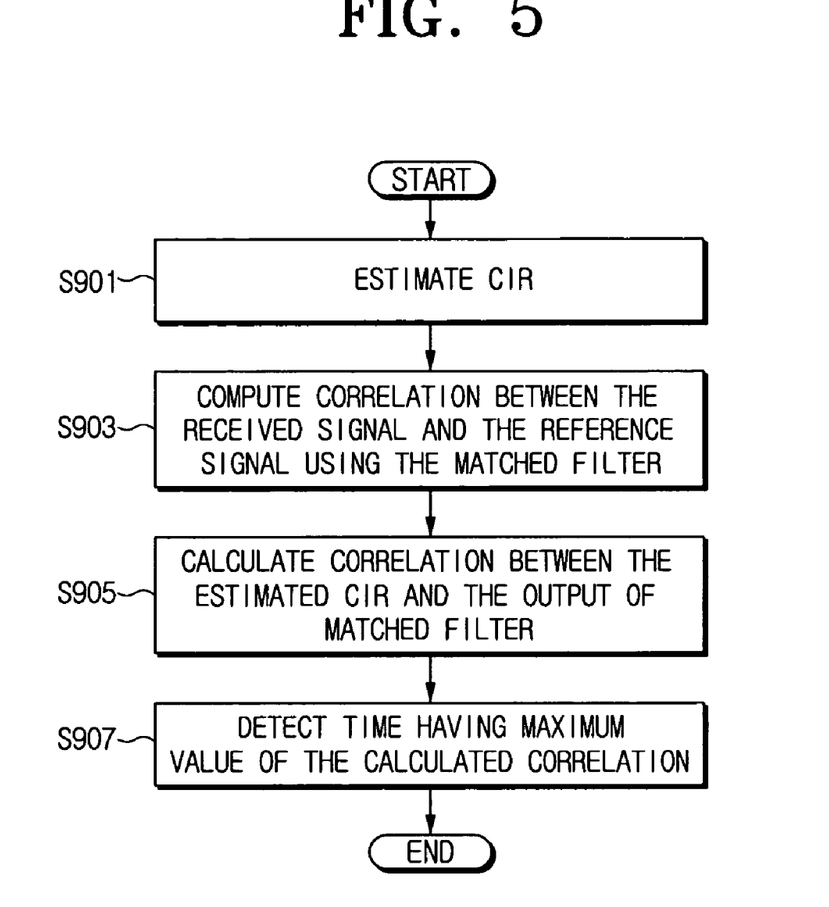
FIG. 5 is a flowchart outlining a symbol timing synchronization method applied to the OFDM receiver according to an exemplary embodiment of the present invention.

FIG. 5 outlines a symbol timing synchronization method applied to the OFDM receiver according to an exemplary embodiment of the present invention.

In FIG. 5, the estimation is made on the CIR of the symbol targeted for the symbol timing synchronization using the previous symbol of the target symbol (S901). The estimation of the CIR of the previous symbol may employ a matched filter, a cross-correlator, and the like.

Next, the matched filter 200 is used to compute the correlation value between the present symbol for the symbol timing synchronization and the reference signal already known to the OFDM receiver (S903). In specific, the CIR of the present symbol is computed through the convolution of the received signal and the reference signal. The CIR of the present symbol is computed from Equation 3 as explained with reference to FIG. 4.

The correlation between the estimated CIR and the output value of the matched filter 200 is calculated (S905). The convolution is performed to the estimated CIR and the output value of the matched filter 200. In other words, the correlation is calculated between the estimated CIR and the CIR of the present symbol based on Equation 4 as illustrated in reference to FIG. 4.

Next, a time having the maximum value is detected from the calculated correlation (S907). The convolution is executed to the estimated CIR and the output value of the matched filter 200, and a maximum value of the convolution values is detected. The time having the detected maximum value is the timing offset between the previous symbol timing and the present symbol timing.

Figure 6A:
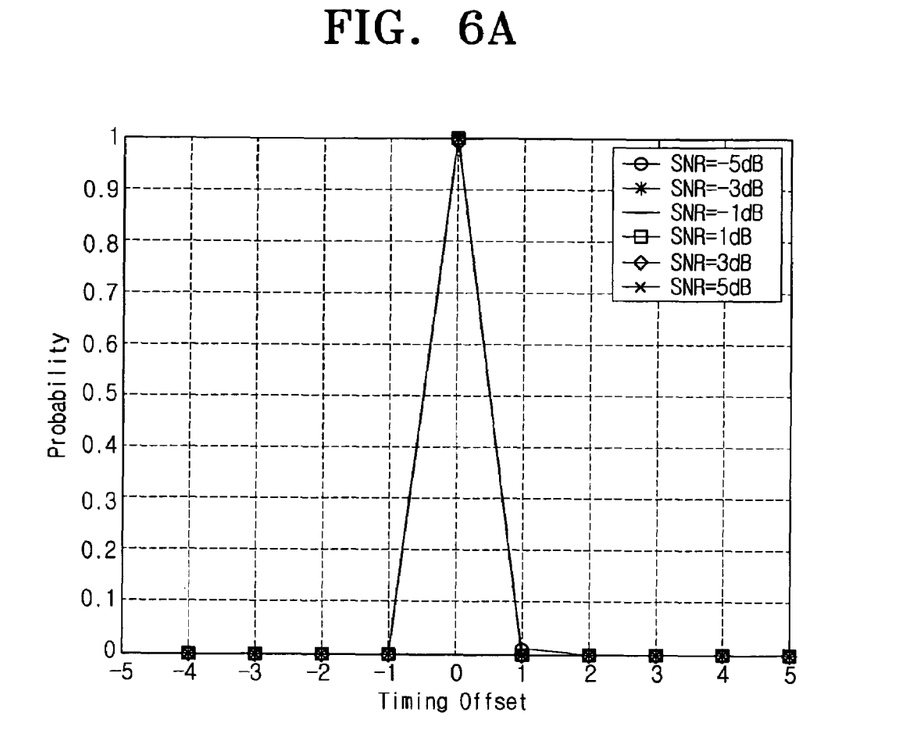
FIGS. 6A and 6B are graphs showing the symbol timing synchronization with respect to the accurate channel impulse response and the estimated channel impulse response.
Figure 6B:
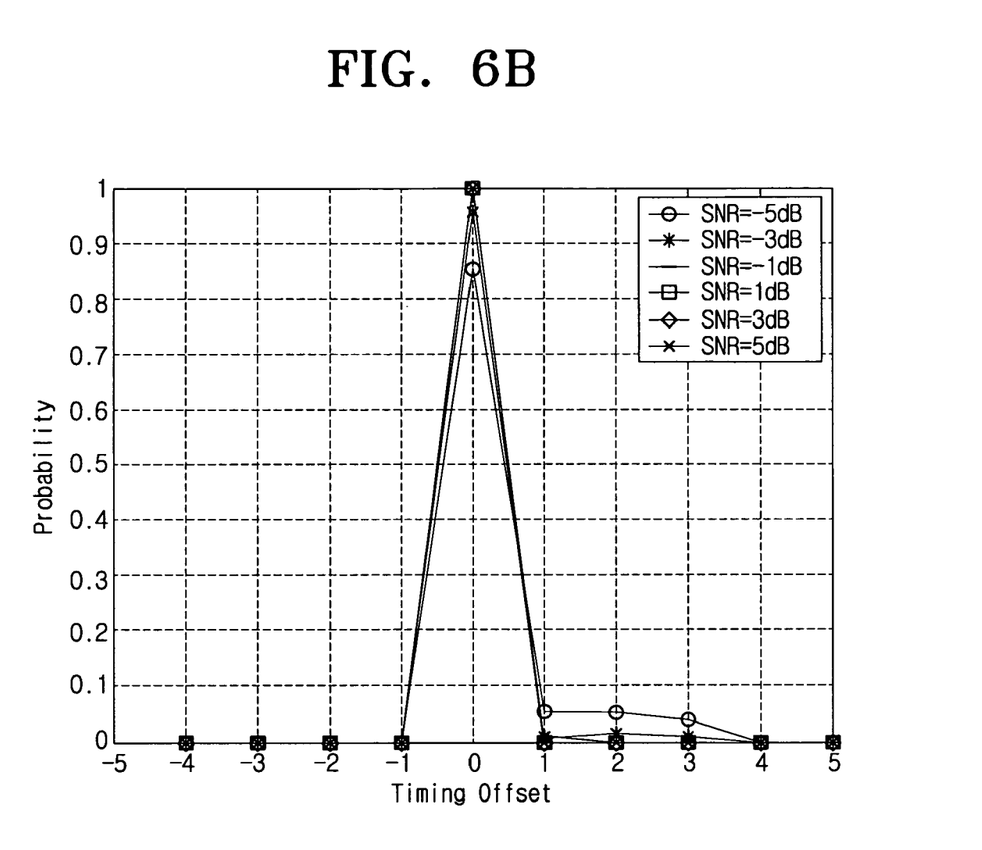

FIGS. 6A and 6B are graphs of the symbol timing synchronization by use of the accurate CIR and the estimated CIR, respectively. FIG. 6A is the graph using the accurate CIR, and FIG. 6B is the graph using the correlation between the estimated CIR and the output of the matched filter 200.

Referring to FIG. 6A, when the symbol timing synchronization is carried out using the accurate CIR, a start point of a fast Fourier transform (FFT) window can be accurately detected at a signal-to-noise ratio (SNR) ranging from −5 dB to +5 dB.

In FIG. 6B, as for the symbol timing synchronization using the estimated CIR at the CIR estimator 100, the start point of the FFT window is detected with high probability at the SNR ranging from −5 dB to +5 dB. When the SNR is −5 dB, −3 dB, and −1 dB, the probability of detecting the start point of the FFT window is about 0.05 with respect to the samples +1, +2, and +3. In effect, the accurate start point of the FFT window can be detected at most of the SNRs.

Figure 7:
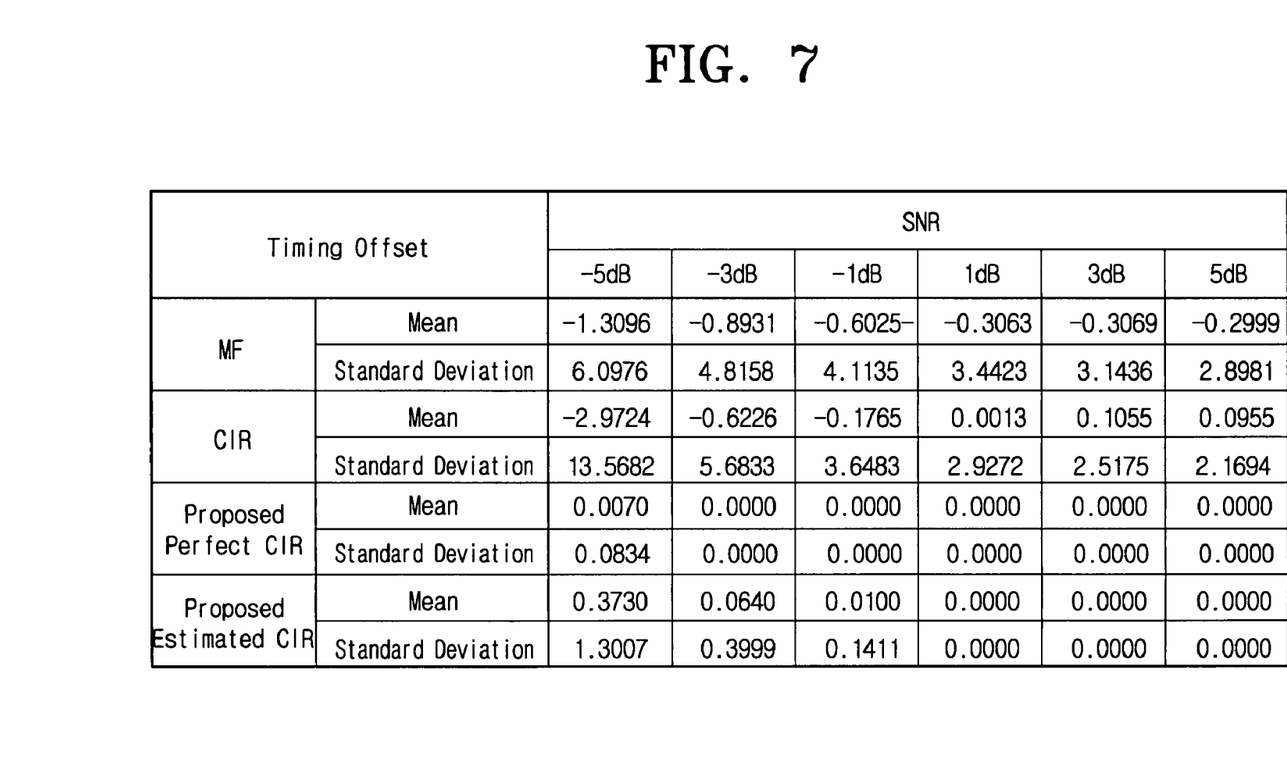
FIG. 7 is a table showing the detected timing offset.

FIG. 7 is a table showing the detected timing offset with respect to the SNR of −5 dB, −3 dB, −1 dB, 1 dB, 3 dB, and 5 dB in four cases: when the matched filter (MF) is obtained for the symbol timing synchronization; when the CIR using the inverse FFT (IFFT) is used; when the accurate CIR is used; and when the estimated CIR according to the present invention is used for the symbol timing synchronization.

As shown in FIG. 7, the CIR estimated at the CIR estimator 100 enables more accurate symbol timing synchronization at most of the SNRs, as compared with the cases using the matched filter and the CIR obtained by the IFFT.

In light of the foregoing as set forth above, the maximum SNR can be attained by detecting the symbol timing offset using the correlation between the estimated CIR and the output of the matched filter, rather than detecting the timing offset directly from the CIR. Accordingly, the present invention is applicable even at the low SNR.

The present invention requires simple implementation and provides the rapid symbol timing synchronization over a short period of time by eliminating a need for other separate components than the correlation calculator that detects the correlation between the estimated CIR and the output of the matched filter for the sake of the symbol timing synchronization.

Furthermore, the accurate symbol timing synchronization is feasible for one sample at most SNRs.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A symbol timing synchronization apparatus comprising:
   a channel impulse response (CIR) estimator which estimates a CIR of a present symbol from which a symbol timing is to be detected, using a previous symbol received prior to the present symbol;
   a matched filter which computes the CIR using the present symbol;
   a correlation calculator which calculates correlation between the estimated CIR and the CIR computed by the matched filter; and
   a peak detector which detects the symbol timing by obtaining a timing offset between the estimated CIR and the computed CIR based on a maximum value of the calculated correlation.

2. The symbol timing synchronization apparatus of claim 1, wherein the CIR estimator comprises one of a matched filter and a cross-correlator.

3. The symbol timing synchronization apparatus of claim 1, wherein the correlation calculator calculates the correlation between the estimated CIR and the computed CIR from the following equation:

$$y(n) = \sum_{l=0}^{L-1} x(l+n-n_0)\hat{h}(l) =$$

$$\sum_{l=0}^{L-1} h(l+n-n_0)\hat{h}(l) + \sum_{l=0}^{L-1}\sum_{m=0}^{N-1} w(l+n-n_0m)c*(m)\hat{h}(l)$$

where y(n) is the calculated correlation, L is a length of a zero prefix, $\hat{h}(l)$ is the estimated CIR, N is a length of an effective symbol duration in one symbol, $x(l+n-n_0)$ is the computed CIR, $h(l+n-n_0)$ is the CIR of the present symbol, $w(l+n-n_0+m)$ is a white Gaussian noise, l is a path number, c(m) is a reference signal, c*(m) is a complex conjugate of c(m), and $n_0$ is the timing offset between the previous symbol and the present symbol.

4. The symbol timing synchronization apparatus of claim 1, wherein the peak detector detects a time having a maximum value of calculation values of the correlation calculator, as the symbol timing of the present symbol.

5. A symbol timing synchronization method comprising:
   estimating a channel impulse response (CIR) of a present symbol from which a symbol timing is to be detected, using a previous symbol received prior to the present symbol, wherein the estimating is performed by a CIR estimator;
   computing the CIR using the present symbol;
   calculating correlation between the estimated CIR and the computed CIR; and
   detecting the symbol timing by obtaining a timing offset between the estimated CIR and the computed CIR based on a maximum value of the calculated correlation.

6. The symbol timing synchronization method of claim 5, wherein the estimated CIR is obtained by one of a matched filter and a cross-correlator.

7. The symbol timing synchronization method of claim 5, wherein the correlation between the estimated CIR and the computed CIR is calculated from the following equation:

$$y(n) = \sum_{l=0}^{L-1} x(l+n-n_0)\hat{h}(l) =$$

$$\sum_{l=0}^{L-1} h(l+n-n_0)\hat{h}(l) + \sum_{l=0}^{L-1}\sum_{m=0}^{N-1} w(l+n-n_0m)c*(m)\hat{h}(l)$$

where y(n) is the calculated correlation, L is a length of a zero-prefix, $\hat{h}(l)$ is the estimated CIR, $x(l+n-n_0)$ is the computed CIR, N is a length of an effective symbol duration in one symbol, $h(l+n-n_0)$ is the CIR of the present symbol, $w(l+n-n_0+m)$ is a white Gaussian noise, $l$ is a path number, $c(m)$ is a reference signal, $c^*(m)$ is a complex conjugate of $c(m)$, and $n_0$ is the timing offset between the previous symbol and the present symbol.

8. The symbol timing synchronization method of claim 5, wherein the detecting of the symbol timing detects a time having a maximum value of the calculated correlation, as the symbol timing of the present symbol.

* * * * *